United States Patent [19]

Pipkin

[11] 4,387,124

[45] Jun. 7, 1983

[54] COATING APPARATUS AND METHOD

[75] Inventor: David J. Pipkin, Longmont, Colo.

[73] Assignee: International Business Machines Corporation, Armonk, N.Y.

[21] Appl. No.: 316,367

[22] Filed: Oct. 29, 1981

[51] Int. Cl.³ .................. B05D 3/12; B05D 5/12; C05C 3/12; C05C 3/18

[52] U.S. Cl. .................. 427/356; 118/106; 118/126; 118/407; 118/413; 427/128; 427/358; 427/371

[58] Field of Search .............. 427/128, 356, 358, 371; 118/106, 126, 407, 413

[56] References Cited

U.S. PATENT DOCUMENTS

| 3,081,191 | 3/1963 | Smith et al. | 117/64 |
| 3,192,895 | 7/1965 | Galer | 118/126 |
| 4,038,442 | 7/1977 | Utumi | 427/128 |
| 4,142,010 | 2/1979 | Pipkin et al. | 427/355 |
| 4,143,190 | 3/1979 | Choinski | 427/420 |
| 4,250,211 | 2/1981 | Damrau et al. | 427/356 |
| 4,324,816 | 4/1982 | Landis et al. | 427/128 |

Primary Examiner—Michael R. Lusignan
Attorney, Agent, or Firm—Francis A. Sirr

[57] ABSTRACT

A wide traveling web is coated on one side thereof by passing the web through a pool of non-Newtonian coating liquid. The pool is replenished by a conduit manifold having at least one inlet port and a plurality of outlet ports. The outlet ports communicate directly with the pool. The inlet port and the outlet ports are interconnected by a plurality of branching conduits. All branching conduits subject the coating liquid to substantially identical flow rheology in that the branching conduits are of substantially equal length and substantially equal fluid shear characteristic.

3 Claims, 3 Drawing Figures

COATING APPARATUS AND METHOD

DESCRIPTION

Technical Field

This invention relates to the field of substrate or web coating apparatus which operates to coat a non-Newtonian coating liquid.

Background of the Invention

The present invention relates generally to coating a moving substrate or web with a non-Newtonian coating fluid or liquid by passing the web into contact with a pool of such liquid, such that a portion of the pool is carried away as a thin coating on at least one side of the web.

The present invention finds particular utility in the manufacture of flexible magnetic recording media. In such a manufacturing process, the web may comprise a wide web of biaxially oriented polyethylene terephthalate, acetates, polyolefins, or other conventional polymeric films which are in the range of 0.0015 inch thick, and are from 12 inches to 48 inches in width. The "magnetic ink" to be coated onto at least one side of such a substrate may vary widely in formulation. However, in all known instances, this ink is a non-Newtonian fluid, i.e., a fluid whose viscosity changes with shear rate. Such fluids have also been described as thixotropic and pseudoplastic fluids.

It is known that the thickness at which such fluids are coated onto such a web is dependent upon the viscosity of the fluid.

A great number of means and apparatus exist which operate to coat such liquids onto a moving web. For example, an excess amount of liquid may be applied, with excess liquid thereafter being removed by operation of a doctor knife. Also, a roller may be used to conduct liquid from a pool to the passing substrate, or the liquid may be extruded in a thin layer directly onto the passing web. The substrate may be routed into a reservoir of coating liquid, either as a free-running web, or while being guided by a backup roller, and air brushes or resilient wipers can be used to thereafter remove excess coating liquid from the substrate.

In all cases, the coating liquid is a consumable and must be replenished to the pool of ink which is immediately at the substrate coating nip or interface.

Summary of the Invention

The present invention provides a heretofore unavailable means for replenishing such a pool of non-Newtonian liquid.

More specifically, the present invention provides a replenishment means whose construction and arrangement insures that the pool is of homogeneous viscosity by insuring that all fluid entering the pool experiences identical flow history or rheology.

In its more specific aspects, and in accordance with this invention, all fluid has passed through substantially identical length flow paths of substantially identical shear characteristic by the time the fluid reaches the coating nip.

The present invention can be readily understood by considering the following example. Assume a magnetic ink coating apparatus which includes a two-foot long pool. This pool can be supplied from say four equally spaced and equal size outlet ports. These ports receive their individual ink supply from a single inlet port, in accordance with the present invention.

The present invention, in its simplest form, provides a first conduit of uniform cross section extending from the one inlet port toward the four outlet ports. This conduit divides into two conduits of equal, uniform cross section, the cross section being one-half that of the first conduit. These two conduits now must extend equal distances before each conduit again divides into two conduits, for a total of four conduits which now connect to the four outlet ports. In order to give equal flow rheology to all four liquid streams, these four conduits are of equal, uniform cross section (one-half that of the conduit feeding them), and must be of equal length.

U.S. Pat. No. 4,038,442 deals with the coating of thixotropic liquids and is exemplary of the failure of the prior art to solve the problem of coating with different viscosity due to different flow history.

The foregoing and other features and advantages of the invention will be apparent from the following more particular description of the preferred embodiments of the invention, as illustrated in the accompanying drawing.

DESCRIPTION OF THE PREFERRED EMBODIMENTS

The present invention will be described in the environment of a preferred coating apparatus. However, the present invention finds utility in any apparatus wherein a pool of non-Newtonian liquid is replenished, and wherein utilization of the liquid from the pool advantageously requires the same viscosity throughout the pool.

Figure 1:
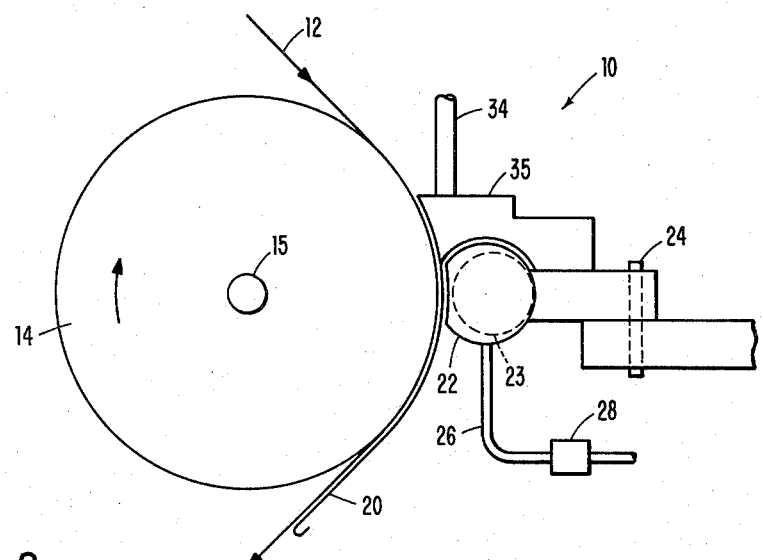
FIG. 1 is a simplified side view of a coating apparatus in accordance with the present invention.

FIG. 1 shows the present invention used with the coating apparatus of copending and commonly assigned U.S. patent application Ser. No. 207,571, filed Nov. 17, 1980, now U.S. Pat. No. 4,345,543, patented Aug. 24, 1982, herein incorporated by reference.

For purposes of showing the utility of the present invention with other coating apparatus, reference may be had to U.S. Pat. Nos. 3,081,191; 3,192,895; 4,142,010; 4,143,190 and 4,250,211; for example.

As shown in FIG. 1 coating apparatus 10 engages web 12 at backup roller 14. Roller 14 is mounted for rotation on axis 15, and is driven at the line speed at which web 12 is moving. Roller 14 is an exemplary 6 inches in diameter, 13.75 inches in axial length, is a circular cylinder, and is made of highly polished metal. Guide rollers, not shown, direct web 12 into contact with at least a substantial portion of the periphery of backup roller 14.

A smoothing film 20 is positioned in an essentially stationary, static fashion adjacent web 12 and a portion thereof extends around the periphery of backup roller 14. Preferably, smoothing film 20 extends over the circumferential portion of web 12 which is in contact with backup roller 14, and extends beyond such contact. Pressure generating means such as pliable membrane 22, carried on metal mandrel 23 and secured to support 24, urges smoothing film 20 into contact with web 12 with a predetermined static force which is a function of the internal pressure within membrane 22. Membrane 22 is tubular in shape, an exemplary 1.5 inches in diameter, and is somewhat longer than film 20 is wide. The tubular axis of membrane 22 extends parallel to the axis of roller 14 for all positions of the membrane. Support 24 preferably allows for movement towards and away from backup roller 14 to vary the circumferential conformance length of membrane 22 to roller 14. For a fixed line speed, the greater the length of membrane conformance, the longer will be the coating zone, as measured in the direction of web travel, and the longer will be the residence time of the web in the coating zone.

Conduit 26 communicates with the interior of membrane 22 and also with pressure regulating means 28 to supply a fluid, preferably air, to the interior of membrane 22. Thus, by regulating the internal pressure of membrane 22, the pressure generating means urges smoothing film 20 into contact with web 12 at a desired static force which may be readily regulated by pressure regulating means 28.

A metering pump, not shown, provides coating liquid to input conduit 34. Manifold 35 contains a reservoir or pool of coating liquid at the confluence of web 12 and smoothing film 20. Preferably, this metering pump is driven by a belt which is connected to roller 14. Thus, the desired amount of coating liquid is provided as a function of the speed of web movement. However, under steady state operating conditions, a constant rate of replenishment, from a fluid source, is workable.

Figure 2:
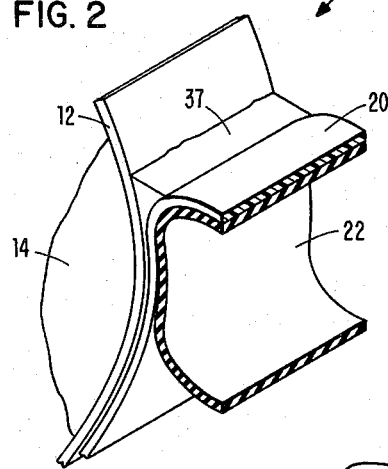
FIG. 2 shows the coating nip of FIG. 1 and the location of the pool of coating liquid within the apparatus of FIG. 1.

FIG. 2 shows the aforementioned pool or reservoir 37 of coating liquid at the confluence of smoothing film 20 and web 12. This pool provides a readily controllable coating on web 12 with, in essence, force generated by membrane 22 controlling the thickness of the coating, and the rate of resupply of the coating liquid controlling the width of the coating. The primary function of stationary smoothing film 20 is to provide an area of high shear force to the coating liquid, this in turn generating high hydrodynamic pressure, to thus spread and smooth the liquid coating material to a uniform thickness. As web 12 emerges from smoothing film 20, a coated substrate is provided with liquid coating material evenly dispersed across the face of web 12 in a smooth and reproducible manner, and without a flow of surplus coating liquid at the trailing end of smoothing film 20.

As those skilled in the art will appreciate, uniform coating, down the length of pool 37 (i.e. parallel to the axis of roller 14), is dependent upon uniform viscosity down the length of the pool.

Figure 3:
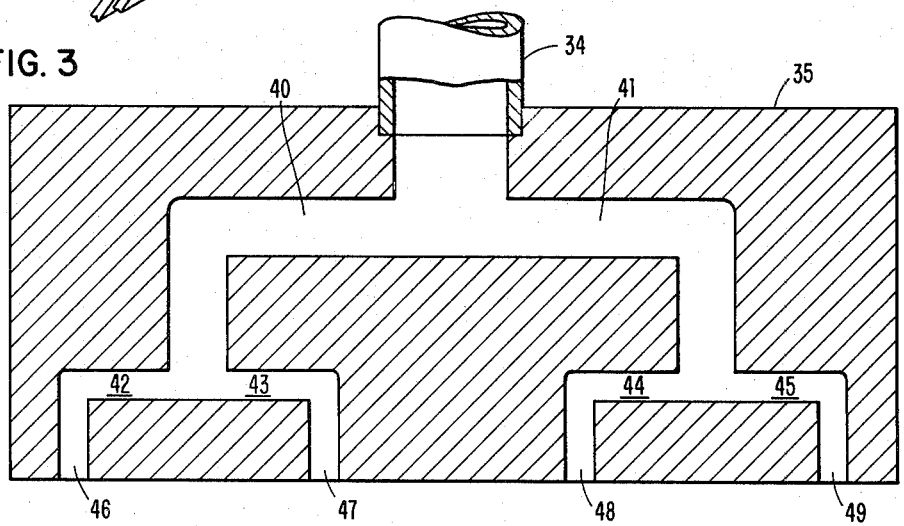
FIG. 3 is a schematic view of the conduit system which replenishes the pool of FIG. 2 with coating liquid in accordance with the present invention.

In order to achieve this uniform viscosity, manifold 35 contains the conduit system shown in FIG. 3. In this figure input conduit 34 branches to two identical conduits 40 and 41. Each of these two conduits branches to two identical conduits 42, 43 and 44, 45. The outlet ports 46–49 are equally spaced down the length of pool 37.

FIG. 3 is of course a two-dimensional view of these conduits, and for simplicity all conduits are of equal depth dimension, i.e., the direction into the figure. The width of conduits 40 and 41 are equal to each other, and the sum of these widths equals the width of conduit 34. In turn, the width of conduits 42, 43, 44, 45 are equal to each other, the sum of any two of these widths equals the width of conduit 40 (or 41), and the sum of all four of these widths equals the width of conduit 34.

In addition, the length of conduits 40 and 41 are equal to each other, and the length of conduits 42, 43, 44 and 45 are also equal to each other.

In this manner, all coating liquid entering pool 37 does so after having experienced similar flow history.

As will be appreciated, FIG. 3 is exemplary of the present invention, but the present invention is not to be limited to the details disclosed in this figure. The essence of this figure is that the branching conduits, whatever their number and whatever their geometric shape, be of substantially equal length, and subject their liquid flow to substantially equal fluid shear between inlet port 34 and pool 37. Stated in another way, all fluid should experience the same velocity of travel, the same mass flow rate, and the same shear rate, while traveling for the same time through the same distance. This uniform rheology insures uniform viscosity and uniform flow at the coating nip.

Another embodiment of the present invention utilizes conduits of progressively ever-increasing width dimension, and of progressively ever-decreasing depth dimension. In this embodiment the total conduit cross-sectional area at any plane of the conduit manifold remains constant, as the individual conduits thereof branch from one inlet conduit to the many outlet conduits. With this arrangement, the length of the pool which is spanned by the sum of the outlet conduit widths may approach the length of the pool itself. For example, and with reference to FIG. 3, when the depth of conduits 42, 43, 44 and 45 are decreased a like amount for each conduit, the width of each conduit must be increased. This increase in width operates to increase the pool length spanned by the sum of the widths of outlet ports 46, 47, 48 and 49.

While the invention has been particularly shown and described with reference to the preferred embodiments thereof, it will be understood by those skilled in the art that various changes in form and details may be made therein without departing from the spirit and scope of the invention.

What is claimed is:
1. A method of feeding a non-Newtonian fluid from a fluid source to an elongated fluid pool which is associated with an elongated web coating nip, whereby said fluid is coated onto a web from a fluid pool as the web passes through said nip, such that the fluid arriving at said pool has experienced substantially identical flow rheology; comprising the steps of:
supplying said fluid to an inlet conduit, and
connecting said inlet conduit to said pool by way of a like number of individual branching conduits which operate to connect said inlet conduit to spaced portions of said pool, said branching conduits being of substantially equal length, and each of said conduits being of substantially equal fluid shear characteristic.

2. In a coating apparatus wherein a traveling substrate passes through an elongated pool of non-Newtonian coating liquid, and thereafter emerges from the nip with a thin coating of the liquid on at least one side thereof, the improvement comprising:
an elongated conduit manifold for replenishing the coating liquid to the pool, said manifold including one input port and a plurality of equally spaced outlet ports which supply the liquid to spaced portions of the pool, and a like plurality of conduit means, of substantially identical length and shear characteristic, connecting said input port to each of said outlet ports.

3. The coating apparatus of claim 2 wherein said plurality of outlet ports comprises an even number of ports, and wherein said like plurality of conduit means comprises individual conduits equal in number to said even number of outlet ports at the output of said conduit means, said individual conduits being divided by two until a single conduit eventually connects to said one inlet port at the input of said conduit means.

* * * * *